(12) United States Patent
Laible et al.

(10) Patent No.: US 8,995,915 B2
(45) Date of Patent: Mar. 31, 2015

(54) METHOD FOR SERVICING A FIELD DEVICE OF AUTOMATION TECHNOLOGY IN A RADIO NETWORK

(75) Inventors: Ingo Laible, Arlesheim (CH); Christian Seiler, Auggen (DE); Stefan Probst, Weil am Rhein (DE); Werner Thoren, Steinen (DE)

(73) Assignee: Endress + Hauser Process Solutions AG, Reinach (CH)

( * ) Notice: Subject to any disclaimer, the term of this patent is extended or adjusted under 35 U.S.C. 154(b) by 219 days.

(21) Appl. No.: 13/508,113

(22) PCT Filed: Oct. 7, 2010

(86) PCT No.: PCT/EP2010/064991
§ 371 (c)(1),
(2), (4) Date: May 4, 2012

(87) PCT Pub. No.: WO2011/054618
PCT Pub. Date: May 12, 2011

(65) Prior Publication Data
US 2012/0220218 A1 Aug. 30, 2012

(30) Foreign Application Priority Data

Nov. 6, 2009 (DE) .......................... 10 2009 046 503

(51) Int. Cl.
*H04B 7/00* (2006.01)
*H04J 3/00* (2006.01)
(Continued)

(52) U.S. Cl.
CPC .......... *G05B 19/4185* (2013.01); *G05B 19/042* (2013.01); *H04L 67/125* (2013.01); *H04L 67/04* (2013.01); *G05B 2219/31162* (2013.01); *H04W 84/18* (2013.01); *H04L 67/104* (2013.01)
USPC ........................... 455/41.3; 370/345; 327/530

(58) Field of Classification Search
CPC .............................. H04L 67/104; H04N 17/04
See application file for complete search history.

(56) References Cited

U.S. PATENT DOCUMENTS

| 7,386,878 B2 * | 6/2008 | Fernando et al. .................. 726/3 |
| 2007/0291122 A1 * | 12/2007 | Schmidt et al. ............... 348/181 |

(Continued)

FOREIGN PATENT DOCUMENTS

| DE | 19624929 A1 | 1/1998 |
| DE | 102005051562 A1 | 5/2007 |

(Continued)

OTHER PUBLICATIONS

International Preliminary Report on Patentability and Written Opinion in corresponding PCT Application No. PCT/EP2010/064991, dated May 8, 2012.

(Continued)

*Primary Examiner* — Andrew Wendell
*Assistant Examiner* — Cindy Trandai
(74) *Attorney, Agent, or Firm* — Bacon & Thomas, PLLC

(57) ABSTRACT

A method for integrating a field device of automation technology into a radio network composed of a plurality of field devices, wherein the field device to be integrated switches, or is switched, at start-up, respectively, first start-up, into a special start-up mode, wherein, in the special start-up mode, a peer to peer connection to a service device or to a selected field device is produced on a specific channel and wherein integration data are transmitted from the service device or the selected field device to the field device to be integrated and/or diagnostic data of the field device are transmitted to the service device or to the selected field device.

4 Claims, 2 Drawing Sheets

(51) Int. Cl.
*G11C 5/14* (2006.01)
*G05B 19/418* (2006.01)
*G05B 19/042* (2006.01)
*H04L 29/08* (2006.01)
*H04W 84/18* (2009.01)

(56) References Cited

U.S. PATENT DOCUMENTS

| | | | |
|---|---|---|---|
| 2008/0267208 A1* | 10/2008 | Sevier | 370/429 |
| 2008/0273518 A1* | 11/2008 | Pratt et al. | 370/345 |
| 2008/0274766 A1* | 11/2008 | Pratt et al. | 455/552.1 |
| 2008/0299915 A1* | 12/2008 | Fink | 455/90.1 |
| 2009/0016462 A1* | 1/2009 | Da Silva Neto | 375/295 |
| 2009/0102601 A1* | 4/2009 | Mathiesen et al. | 340/3.1 |
| 2009/0138104 A1 | 5/2009 | Huck | |
| 2009/0234465 A1* | 9/2009 | Korsten | 700/17 |
| 2010/0091715 A1* | 4/2010 | Akchurin et al. | 370/329 |
| 2010/0277224 A1* | 11/2010 | Jockel et al. | 327/530 |

FOREIGN PATENT DOCUMENTS

| | | |
|---|---|---|
| DE | 102007052955 A1 | 5/2009 |
| DE | 102007054662 A1 | 5/2009 |
| DE | 102009010730 A1 | 10/2009 |
| EP | 1096348 A1 | 5/2001 |
| EP | 1293853 A1 | 3/2003 |
| WO | 2005/094312 A2 | 10/2005 |
| WO | 2005/103851 A1 | 11/2005 |

OTHER PUBLICATIONS

International Search Report in corresponding PCT Application No. PCT/EP2010/064991, dated Jan. 14, 2011.

\* cited by examiner

METHOD FOR SERVICING A FIELD DEVICE OF AUTOMATION TECHNOLOGY IN A RADIO NETWORK

TECHNICAL FIELD

The invention relates to a method for servicing a field device of automation technology. Preferably, the field device is integrated in a radio network composed of a plurality of field devices. For this, it is necessary to transmit to the field device the corresponding configuration and, respectively, integration data. The term 'servicing', as used herein, refers both to the configuring, as well as also to the diagnosis, of a field device by means of a service device or a neighboring field device. The term refers also to data exchange, and, respectively, communication between a field device and a service device, or a neighboring field device.

BACKGROUND DISCUSSION

In automation technology, especially process automation technology, field devices are often applied, which serve for registering and/or influencing process variables. Serving for registering process variables are sensors, such as, for example, fill level measuring devices, flow measuring devices, pressure- and temperature measuring devices, pH-redox potential measuring devices, conductivity measuring devices, etc., which register the corresponding process variables, fill level, flow, pressure, temperature, pH-value, and conductivity, respectively. Serving for influencing process variables are actuators, such as, for example, valves or pumps, via which the flow of a liquid in a pipeline section, or the fill level in a container, can be changed. Referred to as field devices are, in principle, all devices, which are applied near to the process and which deliver, or process, process relevant information. Besides such sensors and actuators, also referred to as field devices are generally also such units, which are participants in a fieldbus and which are able to communicate with superordinated units, so that e.g. remote I/Os, gateways, linking devices and radio adapters are also field devices. A large number of such field devices are available from the Endress + Hauser group of companies.

In modern industrial plants, field devices are, as a rule, connected with superordinated units via bus systems, thus bus systems such as Profibus®, FOUNDATION Fieldbus®, HART®, etc. Normally, the superordinated units are control systems, or control units, such as, for example, a PLC (programmable logic controller). The superordinated units serve, among other things, for process control, process visualizing, process monitoring, as well as for start-up of field devices. The measured values registered by the field devices, here especially field devices in the form of sensors, are transmitted via the particular bus system to one or, in given cases, a number of superordinated unit/units. Along with that, there occurs also, for the purpose of configuring, parametering, diagnosis of field devices or for the purpose of operating actuators, data transmission from the superordinated unit via the bus system to the field devices.

Besides data transmission by wire between the field devices and the superordinated unit, wireless data transmission, or radio transmission of data, is becoming ever more important. Especially in the bus systems, Profibus®, FOUNDATION Fieldbus® and HART®, wireless data transmission via radio is the subject of specifications. Furthermore, radio, or wireless, networks for sensors are specified in greater detail in the standard IEEE 802.15.4. For implementing wireless data transmission, newer field devices, especially sensors and actuators, are partially embodied as radio field devices. These contain, as a rule, a radio unit and an electrical current source as integral components, wherein the electrical current source implements an autarkic electrical current supply of the field device.

Furthermore, there is the opportunity that field devices without radio units, especially sensors and actuators, be upgraded to become radio field devices by connection of wireless adapters that have radio units. A wireless adapter is thus a unit, by which a "conventional" field device, which is designed only for wired connection to a fieldbus, is upgraded to become a radio field device. Such a wireless adapter is described, for example, in the publication WO 2005/103851 A1. The wireless adapter is connected, in such case, to a communication interface, especially to a fieldbus-communication interface, of the field device, wherein the connection between wireless adapter and field device is, as a rule, releasable. Via the fieldbus communication interface, the field device can transmit the data to be transferred via the bus system to the wireless adapter, which transmits such via radio to the target location. Conversely, the wireless adapter, or the radio adapter, can receive data via radio from the gateway and/or the superordinated control unit and forward such via the fieldbus communication interface to the field device. The supplying of the field device with electrical power occurs, as a rule, via an electrical current source, which is associated with the radio adapter or with the field device. The electrical current source is usually a single-use battery or a rechargeable battery.

Radio, or wireless, networks in automation technology are distinguished by small energy consumption and use of a narrow transmission band. The narrow transmission band assures reliable data transmission to an addressed participant/field device at all times. A great advantage in the case of radio, or wireless, networks compared with wired bus systems is the saving of wiring and the avoiding of the therewith associated maintenance. Usually, field devices integrated in a radio network are—as already mentioned—fed via a single-use battery, thus an energy supply unit with limited power capacity. The service life of the single-use battery should, as a rule, be between 5 and 10 years.

Radio, or wireless, networks for automation technology, such as, for example, wireless HART or ISA 100, are embodied as mesh networks of various forms. Attention is paid that each field device, or, generally stated, each node, can communicate with at least two additional nodes, whereby the necessary redundance is created.

An autarkic node for a mesh network is described in WO 2005/094312 A2. In radio, or wireless, networks, communication usually takes place only at certain times. Outside of the active operating phases, the field devices are placed in a resting phase for the purpose of saving energy. In the resting phases, energy consumption is, at least approximately, zero. As already earlier mentioned, it is usual in the case of mesh networks that two nodes, or two field devices, communicate with one another in a narrow frequency band during the relatively short time of a so-called time slot. Furthermore, the center frequency of the frequency band changes according to a predetermined pattern—this method is usually referenced with the technical term "frequency hopping". Frequency hopping reduces the disturbance susceptibility of a radio network.

The integration of a new node, e.g of a replacement—or of an additional field device, into an existing radio network is relatively time intensive, since, for the purpose of integration of an additional field device, a free communication channel, which is defined by the integration parameters, time window and frequency, must be provided. Modern mesh networks are designed to be self-organizing. For this, each node has a synchronization protocol, which enables it to detect neighboring nodes, to determine strength of the transmitted signals, to obtain synchronization information and information concerning frequency hopping and to ascertain the direct radio connections to the neighbors. Apart from the fact that the synchronization protocol must be provided to each field device, there is the problem that the field device during the integration phase has a high energy consumption, which—as already mentioned—in the case of battery operated field devices with a limited power capacity, leads to a shortened service life.

In order to service the field device, in the case of the known solutions, the field device must already be a participant in the radio network; alternatively, a wire connection to the field device must be produced.

SUMMARY OF THE INVENTION

An object of the invention is to provide a method, which permits servicing a field device even when the field device is not yet integrated into the existing radio network.

The object is achieved by features including that the field device to be integrated switches, or is switched, at start-up, respectively, the first start-up, into a special start-up mode, wherein, in the special start-up mode, a peer to peer connection to a service device or to a selected field device is produced on a specific channel and wherein integration data are transmitted from the service device or the selected field device to the field device to be integrated and/or diagnostic data are transmitted from the field device to the service device or to the selected field device. The service device is preferably handheld, e.g. a PDA, or a laptop. According to the invention, thus, integration, or diagnosis, or, generally stated, data exchange, is possible, even though the field device is not integrated into the radio network.

An advantageous embodiment of the method of the invention provides that, in the special start-up mode on a specific channel, a peer to peer connection to a service device or to a selected field device is produced, as soon as a voltage is applied to the field device. The peer to peer connection is, thus, available for data transmission, as soon as the field device is turned on.

Especially for the case, in which the field device to be integrated is a wireless HART field device, it is provided that a fixed IEEE 802.15.4 channel is started, which waits for transmission of an activating packet from the service device, or from the selected field device.

As already stated, it is possible with the invention and its advantageous embodiments to perform a configuration and/or diagnosis of the field device (F), even though the field device is not yet integrated into the radio network. Thus, for example, corresponding integration data for integration of the field device into the radio network can be transmitted offline to the field device.

The field device, which has already been defined as to its different embodiments in the introduction of the description, is either a conventional field device, which is converted into a radio field device by providing it with a radio, or wireless, adapter, or else the field device is originally embodied as a radio field device with associated radio module.

BRIEF DESCRIPTION OF THE DRAWINGS

The invention will now be explained in greater detail based on the appended drawing, the figures of which show as follows.

DETAILED DISCUSSION IN CONJUNCTION WITH THE DRAWINGS

Figure 1:
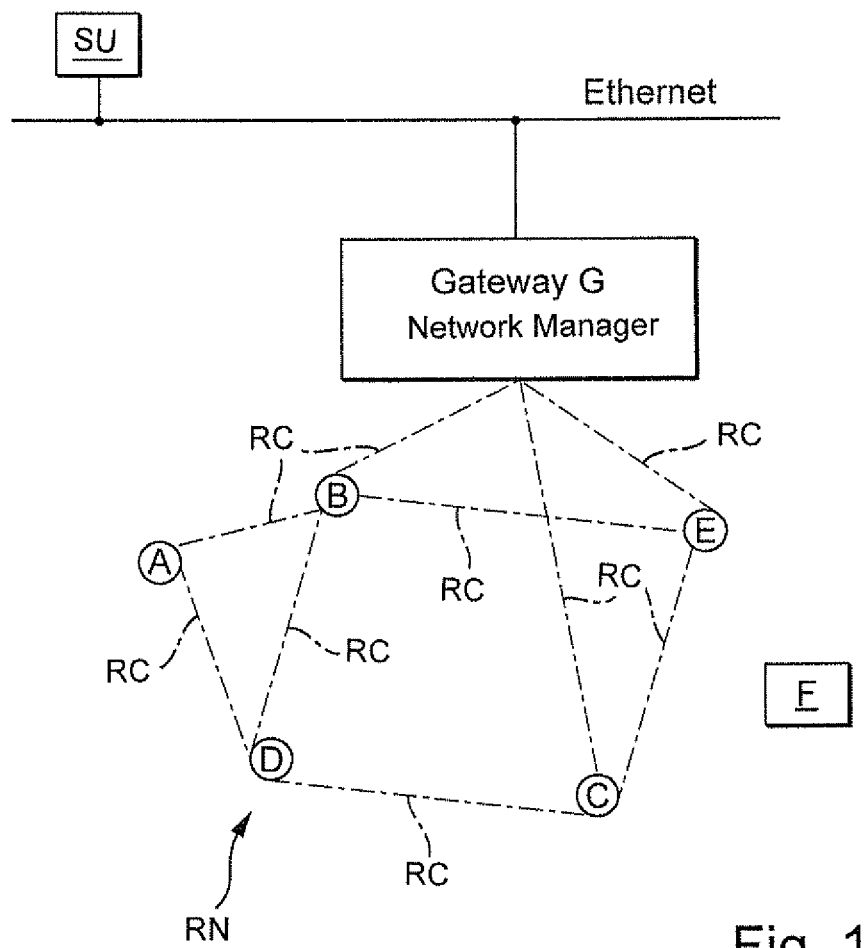
FIG. 1 a schematic representation of a radio network with a plurality of field devices.

FIG. 1 shows in schematic representation a radio network RN, into which, according to an advantageous embodiment of the method of the invention, a supplemental field device F is to be integrated. The radio network RN includes a number of field devices A, B, C, D, E (which are embodied all as radio field devices) and a gateway G. Via the gateway G and one of the fieldbusses known in automation technology, the field devices A, B, C, D, F can be accessed on the radio network RN. Gateway G performs, in the illustrated case, the function of a protocol converter as well as also the function of a network manager.

Field devices A, B, C, D, E are in radio connection RC with one another and with the gateway G, this being shown in FIG. 1 by the dashed lines. Since the field devices A, B, C, D, E and the gateway G can each communicate with one another via a number of redundant radio connections RC, there remains, even in the case of failure of one of the radio connections RC, communication via one of the other radio connections RC. The radio transmission technology for the radio connections RC can be any of the known technologies, such as, for example, the frequency hopping spread spectrum (FHSS) method or the direct sequence spread spectrum (DSSS) method. Due to the required small transmission powers, also ultra wide band technology (UWB) is quite suitable. The gateway G can be a configuration/management system, e.g. the 'Fieldgate' product of the Endress+Hauser group of companies. Gateway G communicates via the radio network RN and, respectively, via the fieldbus, with a superordinated unit SU. The connection to the superordinated unit SU can be implemented via a cable connection or via a radio connection. Preferably, on the control level, where the superordinated control unit SU is arranged, a protocol with high transmission rates, e.g. the Ethernet protocol, is used, while, in the field plane, in which the field devices A, B, C, D, E and the gateway G are arranged, one of the usual fieldbusses is applied. Such fieldbusses have already been mentioned above.

Figure 2:
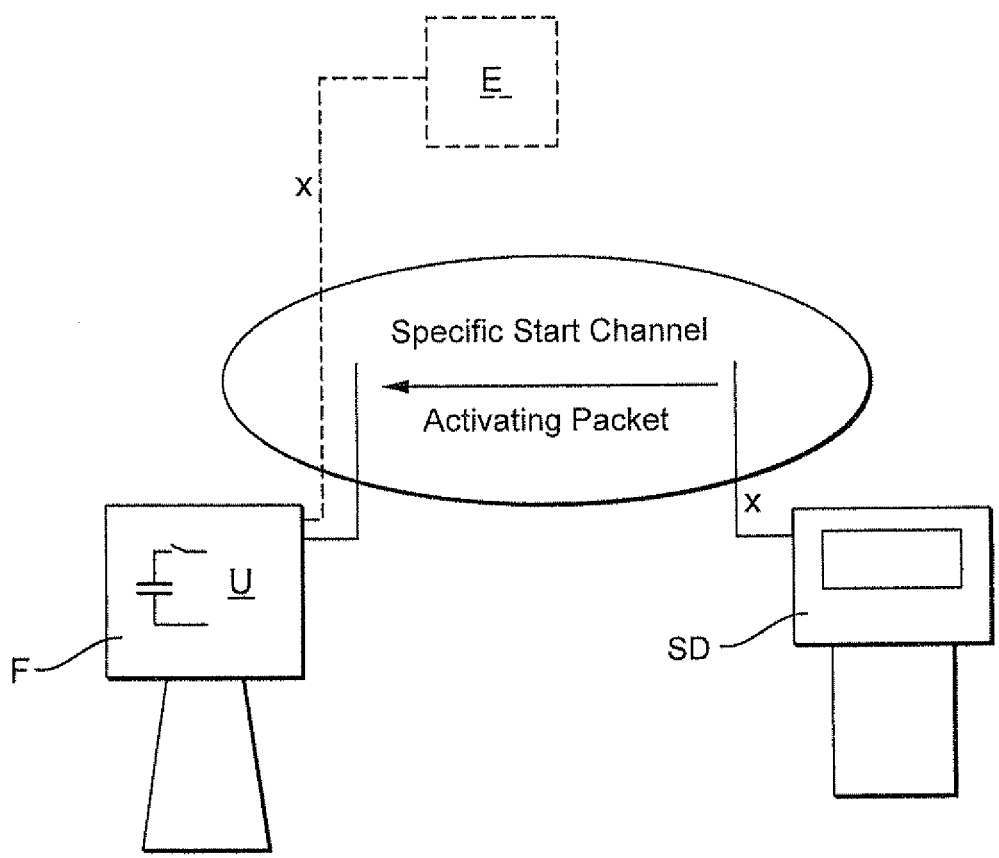
FIG. 2 IS a preferred embodiment of an apparatus for performing the method of the invention.

FIG. 2 shows a preferred embodiment of an apparatus for performing the method of the invention. At start-up, respectively, first start-up, field device F is switched into a special start-up mode. The switching into the special start-up mode is triggered preferably by application of a voltage U to the field device F. An option is also that a technician operates a switch. For example, a wireless HART device starts on a fixed IEEE 802.15.4 channel and waits then for an activating packet from the connected service device SD. The service device is, for example, a laptop, a PDA or a cell phone. Thus, for example, in the case of a conventional field device F, which has been upgraded via a wireless adapter to become a radio field device, electrical current supply of the field device F occurs preferably via the wireless adapter. Corresponding wireless adapters are available from the assignee. Through this embodiment, it is possible to configure via a radio channel the field device F to be integrated, even though the network connection has not yet been made. Preferably for this, a peer to peer connection to the service device SD is produced on a specific channel X. An option, however, also, is to make the peer to peer connection to a selected field device E, which is already integrated into the radio network RN.

For the case, in which the field device to be integrated F involves a wireless HART field device F, a specific start-up channel, e.g. a fixed IEEE 802.15.4 channel, is started, which waits for the transmission of an activating packet from the service device SD.

Especially advantageous in this regard is that a configuration and/or diagnosis of the field device F can be performed, even when the field device F is not yet integrated into the radio network RN.

The invention claimed is:

1. A method for integrating a field device of automation technology with radio communication into a radio network, in which a number of field devices communicate via radio with a superordinated control unit, comprising the steps of:
   the field device to be integrated is switched, at start-up, respectively, first start-up, into a special start-up mode;
   in the special start-up mode, a peer to peer connection to a selected field device, which is already integrated into the radio network, is produced on a specific channel;
   integration data are transmitted from the selected field device to the field device to be integrated and configuration of the field device is performed and/or diagnostic data are transmitted from the field device to the selected field device and diagnosis of the field device is performed, wherein the field device is not yet integrated into the radio network; and
   integrating the field device into the radio network.

2. The method as claimed in claim 1, wherein: in the special start-up mode on the specific channel, the peer to peer connection to the selected field device is produced, as soon as voltage is applied to the field device.

3. The method as claimed in claim 1, wherein: for a case, in which the field device to be integrated is a wireless HART field device, a fixed IEEE 802.15.4 channel is started, which waits for transmission of an activating packet from a service device, or from the selected field device.

4. The method as claimed in claim 1, wherein: as field device a conventional field device is used, which is converted into a radio field device by providing it with a radio, or wireless, adapter.

* * * * *